United States Patent [19]
Kato et al.

[11] Patent Number: 5,648,809
[45] Date of Patent: Jul. 15, 1997

[54] COLOR IMAGE CONTROL APPARATUS HAVING PHOTOSENSITIVE BODY AND INTERMEDIATE TRANSFER BODY

[75] Inventors: Takeshi Kato; Hiroyuki Tadokoro; Nobuaki Fukasawa, all of Hitachi, Japan

[73] Assignee: Hitachi, Ltd., Tokyo, Japan

[21] Appl. No.: 291,543

[22] Filed: Aug. 16, 1994

[30] Foreign Application Priority Data

Aug. 20, 1993 [JP] Japan .................... 5-206061

[51] Int. Cl.$^6$ .................................... B41J 2/385
[52] U.S. Cl. .................. 347/115; 347/232; 347/250
[58] Field of Search .................... 347/232, 248, 347/250, 235, 115, 116, 119

[56] References Cited

U.S. PATENT DOCUMENTS 5,285,221  2/1994  Sumiyoshi et al. ............ 347/119

FOREIGN PATENT DOCUMENTS 6219587  8/1987  Japan .

*Primary Examiner*—Mark J. Reinhart
*Attorney, Agent, or Firm*—Antonelli, Terry, Stout & Kraus, LLP

[57] ABSTRACT

A color printer has means for setting toner image forming areas in the paper sheet convey direction in respect of respective colors, means for detecting a reference position on a photosensitive belt, and image formation start position setting means responsive to the reference position to set a toner image (electrostatic latent image) formation start position in the rotation direction of the photosensitive belt. When the paper sheet length is longer than the outer peripheral length of an intermediate transfer member, the image formation start position setting means sets, for colors other than the final color, a printing area which is shorter than the outer peripheral length of the intermediate transfer member and sets, for the final color, a printing area which begins immediately after a seam position of the photosensitive belt and conforms to the paper sheet length. Through the above setting, when toner images of two colors are superposed to print a color image, the printing area of the final color can be set to a desired range in the paper sheet length direction regardless of the outer peripheral length of the intermediate transfer member, thereby improving the printing speed and preventing degradation of quality.

3 Claims, 9 Drawing Sheets

$Lb \leq 2La$

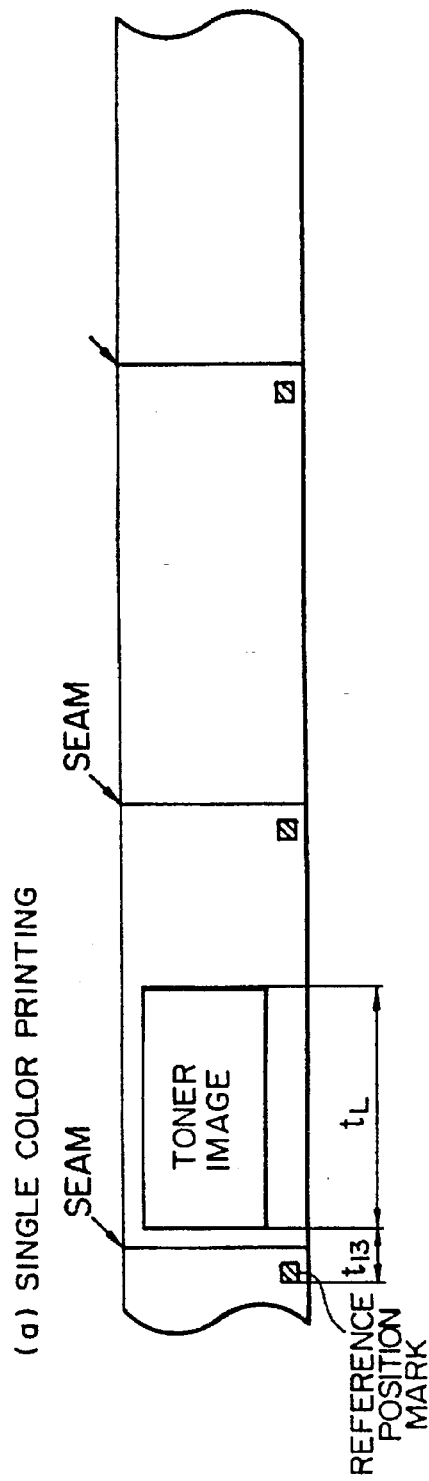
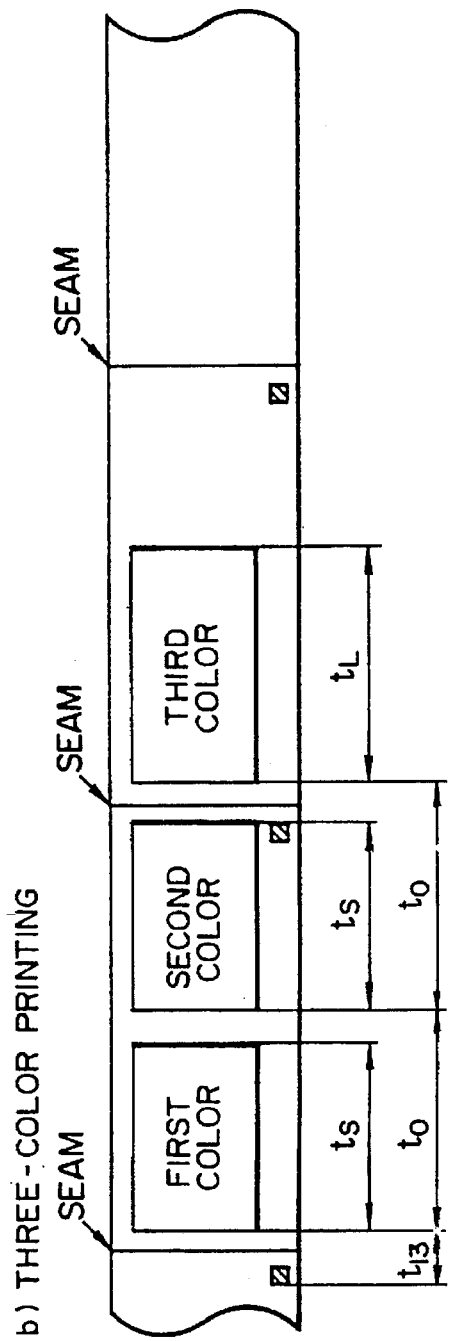

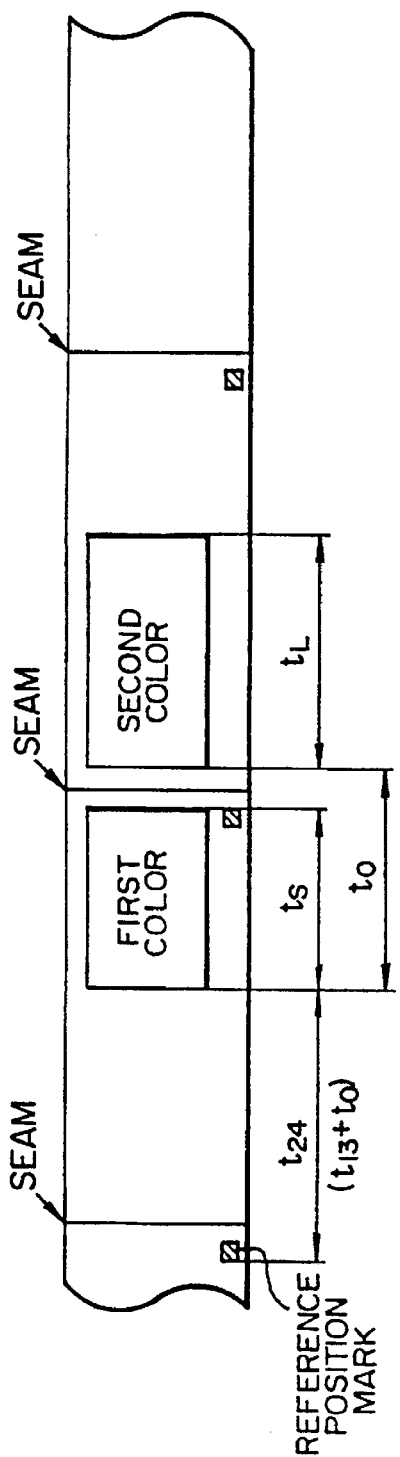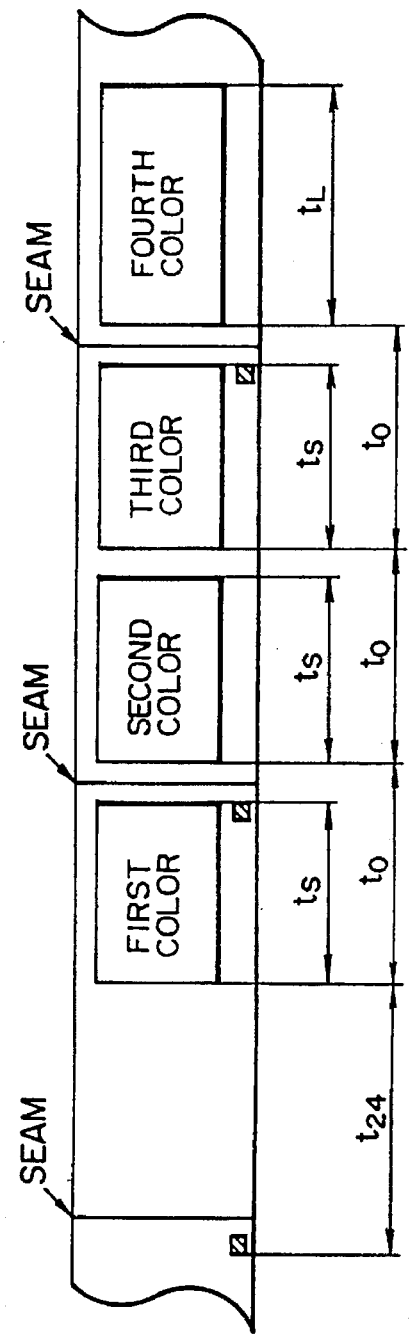

COLOR IMAGE CONTROL APPARATUS HAVING PHOTOSENSITIVE BODY AND INTERMEDIATE TRANSFER BODY

BACKGROUND OF THE INVENTION

The present invention relates to laser printers and more particularly to a color laser printer in which toner images of different colors are superposed on an intermediate transfer member to provide a color image.

In a conventional color laser printer of the type in which toner images of respective colors are superposed on an intermediate transfer member so as to be recorded thereon, the accuracy of register of toner images of respective colors to be superposed on the intermediate transfer member must be improved in order to obtain a color image of high quality. In JP-A-62-195687, in an effort to improve the register accuracy, drive means for driving a photosensitive member and means for driving an intermediate transfer member are controlled in synchronism with a common clock signal. Further, the timings for exposure and transfer of respective colors and printing synchronization timing signals corresponding to a printing area (a printing permission signal in the main scanning direction vertical to the rotation direction of the photosensitive member, that is Hsync, and a printing permission signal in the auxiliary scanning direction which coincides with the rotation direction of the photosensitive member, that is, Vsync) are controlled using the clock signal. The printing area is the same for the respective colors and the printing synchronization timing signal for one color is controllably generated every revolution of the intermediate transfer member in synchronism with the rotation of the intermediate transfer member.

When the photosensitive member has the form of a belt, a belt to be used is preferably endless but from the standpoint of production cost, a seamed belt is used more frequently than an endless belt. With the seamed belt used, an electrostatic latent image cannot be formed on a seam and hence the position of the seam is always managed to control the formation of an electrostatic latent image such that the electrostatic latent image is formed at a position other than the seam.

In the above prior art, the process for transfer of toner images onto the intermediate transfer member is effected sequentially plural times to form a color image and the toner images are transferred collectively to a paper sheet, thus making a printing area dependent on the outer peripheral length of the intermediate transfer member. But when only a toner image of single color is printed, the superposition of toner images on the intermediate transfer member is not effected and as soon as the toner image formed on the photosensitive member is transferred to the intermediate transfer member, it is transferred to a paper sheet and therefore the printing area does not depend on the outer peripheral length of the intermediate transfer member.

When toner images of a plurality of colors are superposed on the intermediate transfer member to form and print a color image, the toner images are superposed on the intermediate transfer member and therefore with a toner image formed at an area which is longer than the outer peripheral length of the intermediate transfer member, toner images of that color are superposed. This implies that the maximum length of the printing area is limited to the outer peripheral length of the intermediate transfer member.

More particularly, when printing a color image formed by superposing toner images of a plurality of colors to a paper sheet of a size which is shorter than the outer peripheral length of the intermediate transfer member, printing to a desired area in the direction of the paper sheet length is allowed. However, when printing a color image formed by superposing toner images of a plurality of colors to a paper sheet of a size which is longer than the outer peripheral length of the intermediate transfer member, there arises a problem that the maximum size of a printing permissible area in the direction of the paper sheet length is limited approximately to the outer peripheral length of the intermediate transfer member.

SUMMARY OF THE INVENTION

An object of the present invention is to provide a color laser printer which can permit printing to a desired area in the direction of the paper sheet length even when a color image formed by superposing toner images of a plurality of colors is printed.

According to the present invention, in a color printer comprising video signal generation means for generating image data, means for controlling flicker of a laser beam modulated with the video signal, exposure means for scanning the laser beam in a direction of the width (raster direction) of a recording medium by means of a rotary polygon mirror, photodetection means for generating a printing synchronization signal (BDT signal) which indicates that the scanning beam reaches a predetermined position, a photosensitive member exposed by the exposure means to form an electrostatic latent image, photosensitive member drive means for driving the photosensitive member, developing means for developing the electrostatic latent image formed on the photosensitive member to form a toner image on the photosensitive member, an intermediate transfer member being partly in contact with the photosensitive member to permit the toner image to be transferred to the intermediate transfer member, and drive means for driving the intermediate transfer member, whereby the photosensitive member is repetitively rotated by plural times, the exposure means is controlled in accordance with image data supplied from the image data generation means to sequentially form electrostatic latent images for toner images of different colors on the photosensitive member, the electrostatic latent images are developed by the developing means to form the toner images of different colors, the toner images are sequentially transferred to the intermediate transfer member to form a color image thereon, and thereafter the toner images are collectively transferred to a paper sheet conveyed by convey means to form the color image, means is provided which sets a toner image forming area in the paper sheet convey direction in respect of each toner image and when printing to a paper sheet having a length in the paper sheet convey direction which is longer than the outer peripheral length of the intermediate transfer member, a toner image formation area in the paper sheet convey direction for the final color is set to an area which is longer than the outer peripheral length of the intermediate transfer member. It is often required that a color image be coexistent with a black image and the black image be printed to a longer area, and the present printing scheme is especially effective to meet this requirement.

Further, in a color printer in which the photosensitive member is a seamed belt, means for detecting a reference position on the photosensitive member and means for setting a toner image formation start position of the first color on the basis of the reference position are provided, whereby a toner image start position for the final color is set immediately after a seam position on the photosensitive belt regardless of the number of toner images to be transferred sequentially to the intermediate transfer member.

In a color printer in which a process of transferring toner images to the intermediate transfer member is effected sequentially plural times to form a color image and collective transfer of the toner images is effected, when printing a color image formed by superposing toner images of a plurality of colors, the toner images are superposed on the intermediate transfer member and therefore, when a toner image is formed at an area which is longer than the outer peripheral length of the intermediate transfer member, toner images of that color are superposed. However, the process is such that a toner image of the final color is superposed on the other toner images transferred to the intermediate transfer member and is transferred to a paper sheet in the immediately succeeding process and therefore, even when the image formation area on the photosensitive member is made to be longer than the outer peripheral length of the intermediate transfer member, the toner images can be printed to the paper sheet without being superposed.

More specifically, when printing a color image formed by superposing toner images to a paper sheet having a size longer than the outer peripheral length of the intermediate transfer member, printing to a desired area in the direction of the paper sheet length can be ensured by setting only the printing area for the final color to a printing area conforming to the paper sheet length.

Further, in a color printer in which the photosensitive member has the form of a seamed belt, the photosensitive belt has an outer peripheral length which is twice that of the intermediate transfer member. Therefore, when toner images of the first, second, third and fourth colors are sequentially transferred to the intermediate transfer member to form a color image thereon, toner images of two colors are formed on the photosensitive member over the entire length thereof, so that while the photosensitive belt makes one revolution round, the intermediate transfer member is rotated by two revolution rounds to sequentially transfer the toner images of two colors to the intermediate transfer member. If only the printing area of the final color is set to a printing area which conforms to the printing paper length as described previously, the rear portion of the printing area of the final color gets entangled with the seam and no electrostatic latent image is formed on the seam, causing a defective image. However, by starting the formation of a latent image of the final color immediately after the seam position on the photosensitive belt regardless of the number of toner images to be sequentially transferred to the intermediate transfer member, a toner image can be formed without causing the rear portion of the printing area of the final color to get entangled with the seam of the photosensitive belt.

BRIEF DESCRIPTION OF THE DRAWINGS

FIGS. 8A and 8B are diagrams showing toner image forming positions (1) on the photosensitive belt of the present invention.

FIGS. 9A and 9B are diagrams showing toner image forming positions (2) on the photosensitive belt of the present invention.

DESCRIPTION OF THE PREFERRED EMBODIMENTS

Figure 1:
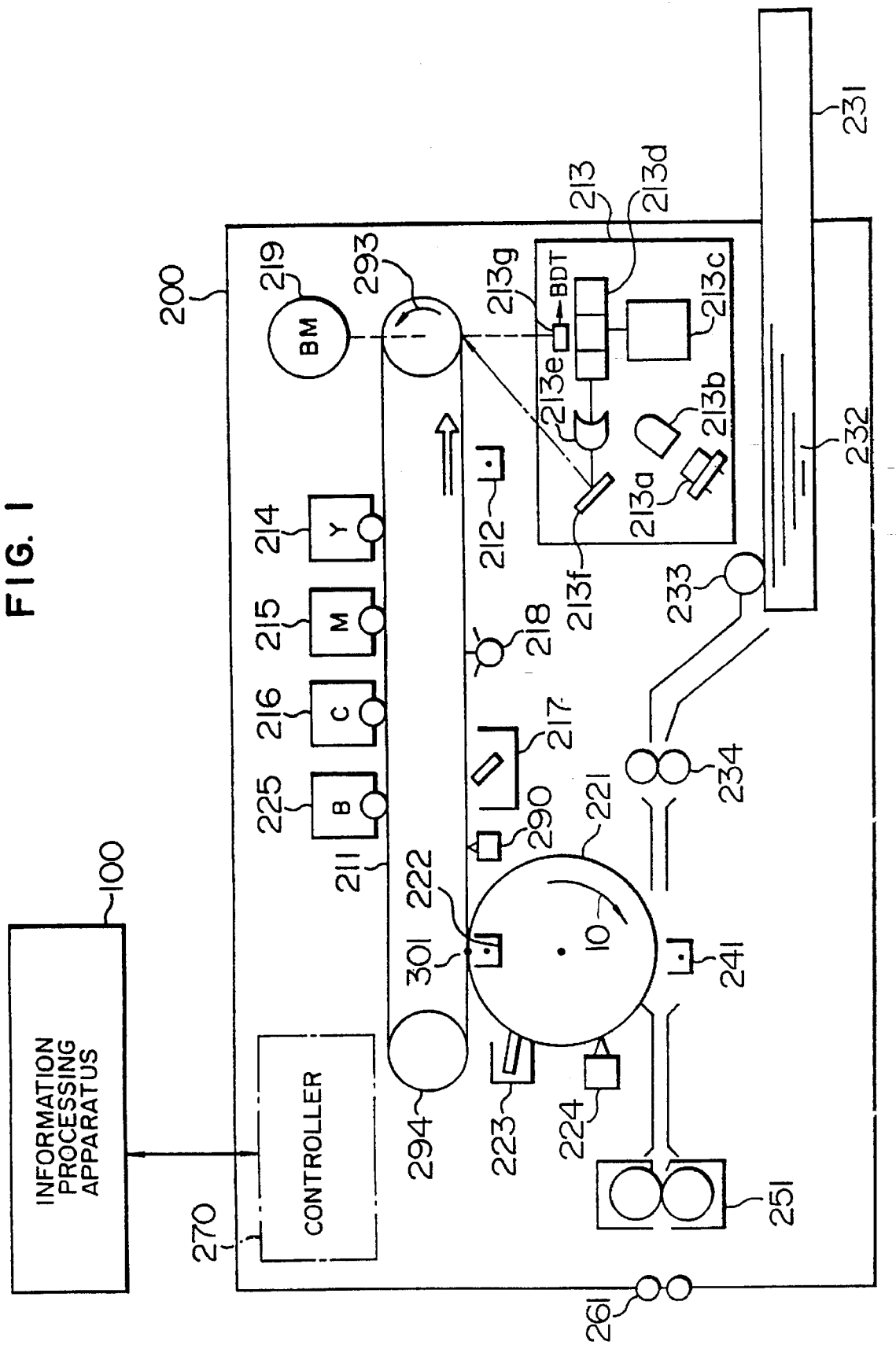
FIG. 1 is a longitudinal sectional side view of a first embodiment of a color printer according to the present invention.

FIG. 1 is a diagram showing, in longitudinal sectional side view form, a color laser printer 200 connected to an information processing apparatus 100.

Figure 2:
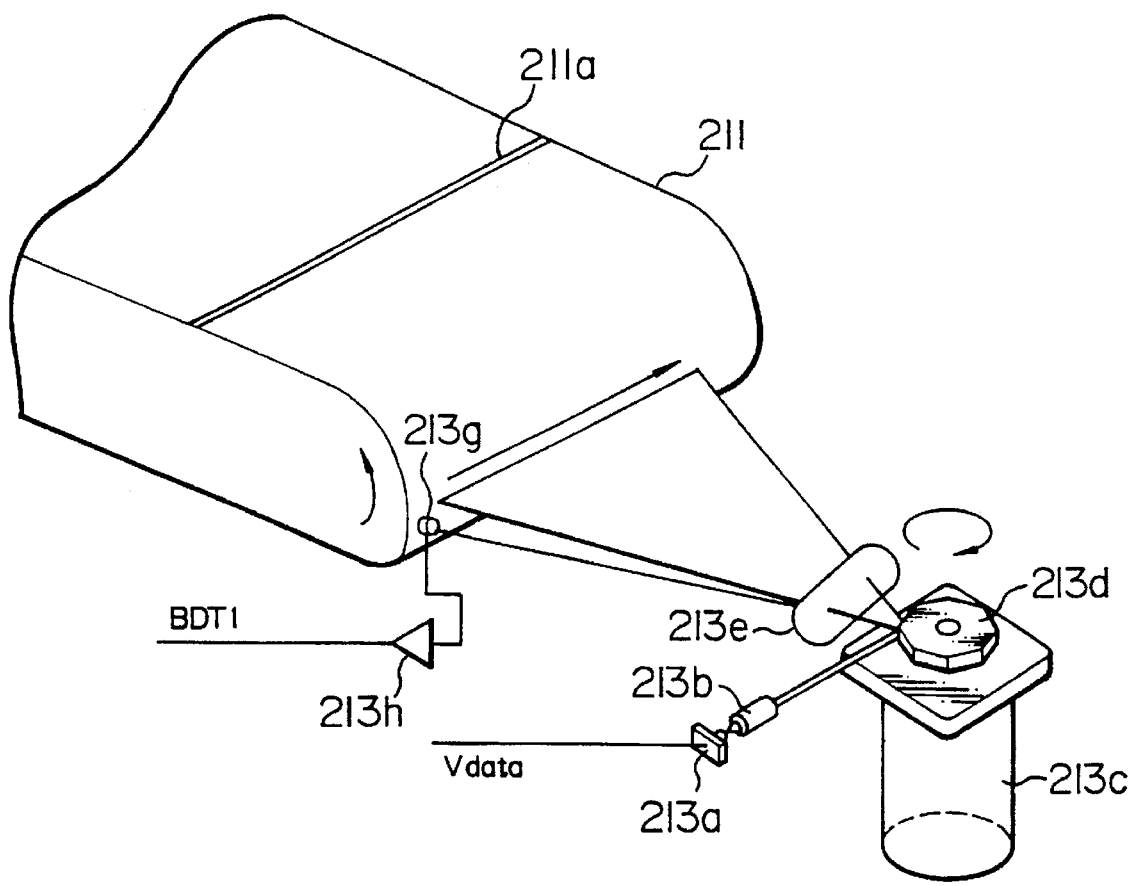
FIG. 2 is a diagram showing the arrangement of a beam detector for detecting the timing for a beam spot to pass through a deflection scanning start reference position.
Figure 3:
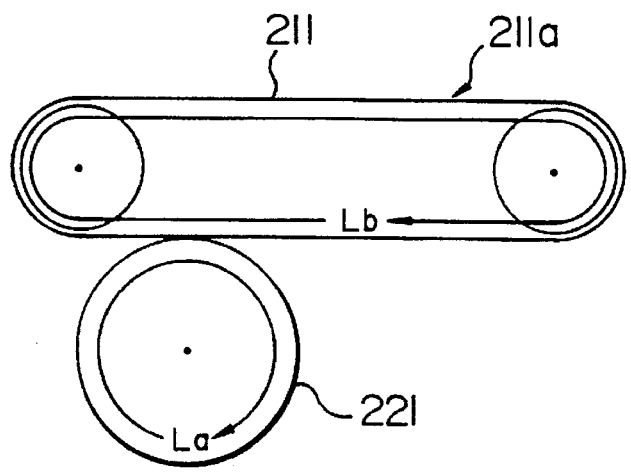
FIG. 3 is a diagram showing the relation between a photosensitive belt and the outer peripheral length of an intermediate transfer drum.

A printing unit of the color laser printer 200 includes a photosensitive member (photosensitive belt) 211 in the form of a belt applied around a driving roller 293 and a driven roller 294, a belt drive motor 219 for driving the driving roller 293, adapted to rotate the photosensitive belt 211, at a predetermined speed, a photosensor 290 of reflection type for reading a reference position mark formed on the outer peripheral surface of the photosensitive belt 211 in order to generate a reference position signal HPS of the auxiliary scanning (rotation) direction of the photosensitive belt 211, a charger 212 for uniformly charging the surface of the photosensitive belt 211, a scanning/exposing unit 213 for exposing the uniformly charged photosensitive belt surface to form an electrostatic latent image on the surface, four developing units 214, 215, 216 and 225 for developing electrostatic latent images to form toner images on the photosensitive belt surface (each developing unit incorporating a sensor for detecting the presence or absence of developer), a belt cleaner 217 for removing toner remaining on the photosensitive belt after the toner images have been transferred to an intermediate transfer drum 221 to be described later, and an erase lamp 218 for removing electric charge remaining on the photosensitive belt surface. The photosensitive belt has a seam 211a as shown in FIGS. 2 and 3. Typically, as shown in FIG. 3, the photosensitive belt 211 has an outer peripheral length which is twice that of the intermediate transfer member 221.

In the scanning/exposing unit 213, a laser beam delivered out of a semiconductor laser beam source 213a while being so modulated with a video signal as to flicker is condensed by a condensing lens 213b into a parallel laser beam, the laser beam is reflected at a polygon mirror 213d, driven by a mirror drive motor 213c to rotate at a constant speed, to provide a repetitively deflected beam, and the deflected beam is irradiated on the surface of the photosensitive belt 221 through a projection lens 213e and a folding mirror 213f to form a beam spot which is scanned to expose the photosensitive belt surface. The scanning/exposing unit 213 also includes, as shown in FIG. 2, a beam detector 213g for detecting the timing for the beam spot to pass a deflection scanning reference position each time that the deflection scanning proceeds, and a signal produced from the beam detector 213g is amplified by an amplifier 213h and delivered as a deflection scanning start reference detecting signal BDT1.

The developing unit 214 uses toner of yellow color (Y) as a developer, the developing unit 215 uses toner of magenta color (M) as a developer, the developing unit 216 uses toner of cyan color (C) as a developer and the developing unit 255 uses toner of black color (B) as a developer; and a bias voltage applied to each developing unit is controlled to apply the developing function to each developing unit or remove the developing function from each developing unit. The bias voltage can be controlled by a designation signal from the information processing apparatus 100 so that a developing unit corresponding to a designated color of a video signal used for formation of an electrostatic latent image may function effectively.

The intermediate transfer drum 221 is used to complete a single color toner image by superposing a plurality of toner images formed on the surface of the photosensitive belt 211 and transfer the color toner image to a paper sheet. The intermediate transfer drum 221 uses the photosensitive belt drive motor 219 as a driving source and receives force from a single contact portion 301 to the photosensitive belt 211 so as to be driven to rotate in a direction of arrow 10 at a speed synchronous with the photosensitive belt surface. Inside the intermediate transfer drum, a transferrer 222 for transferring a toner image on the photosensitive belt surface to the intermediate transfer drum is arranged at an area where the intermediate transfer drum is in contact with the photosensitive belt surface. For removal of toner remaining on the surface of the intermediate transfer drum 221, a cleaner 223 is arranged which is separably contactable to the surface of the intermediate transfer drum 221. Further, for generation of a reference position signal TPS of the intermediate transfer drum 221, there is arranged a photosensor 224 of a reflection type for reading a reference position mark formed on the outer peripheral surface of the intermediate transfer drum 221. The intermediate transfer drum 221 has its outer periphery defined such that the BDT1 signal delivered out of the scanning/exposing unit 213 is always scanned by an integer number of times during a time interval in which the intermediate transfer drum makes one revolution round. As shown in FIG. 3, the relation between outer peripheral length La of the intermediate transfer drum and outer peripheral length Lb of the photosensitive belt 211 is set to a ratio of 1:2 (Lb=2 La) and when toner images of two colors, three colors or four colors are transferred sequentially to the intermediate transfer drum to form a color image thereon, the intermediate transfer drum makes two revolution rounds while the photosensitive belt makes one revolution round and consequently, electrostatic latent images of two colors are transferred to the intermediate transfer drum.

A paper feed cassette 231 accommodates paper sheets 232 and a paper feed roller 233 extracts a paper sheet 232 and supplies it to resist rollers 234. The resist rollers 234 press the fore end of the paper sheet 232 conveyed from the paper feed roller 233 to stop the advancement of the paper sheet 232 to adjust paper pay-out control and paper supply timing.

A transferrer 241 applies transfer electric charge to the backside of the paper sheet 232 at an area where the paper sheet 232 conveyed from the resist rollers 234 contacts the intermediate transfer drum 221, so that the toner images on the surface of the intermediate transfer drum 221 can be transferred to the paper sheet 232.

In a fixing unit 251, the paper sheet 232 with the transferred toner images is passed between a heating roller and a pressuring roller and the toner images are fused (fixed) to the paper sheet 232.

Paper pay-out rollers 261 discharges the paper sheet 232 with the fixed toner images to the outside of the apparatus.

A controller 270 is connected to the host information processing apparatus 100 to perform transmission and reception of control information and printing data (video data) to and from the information processing apparatus 100 and controls internal constituent means of the laser printer 200 to execute printing control.

Figure 4:
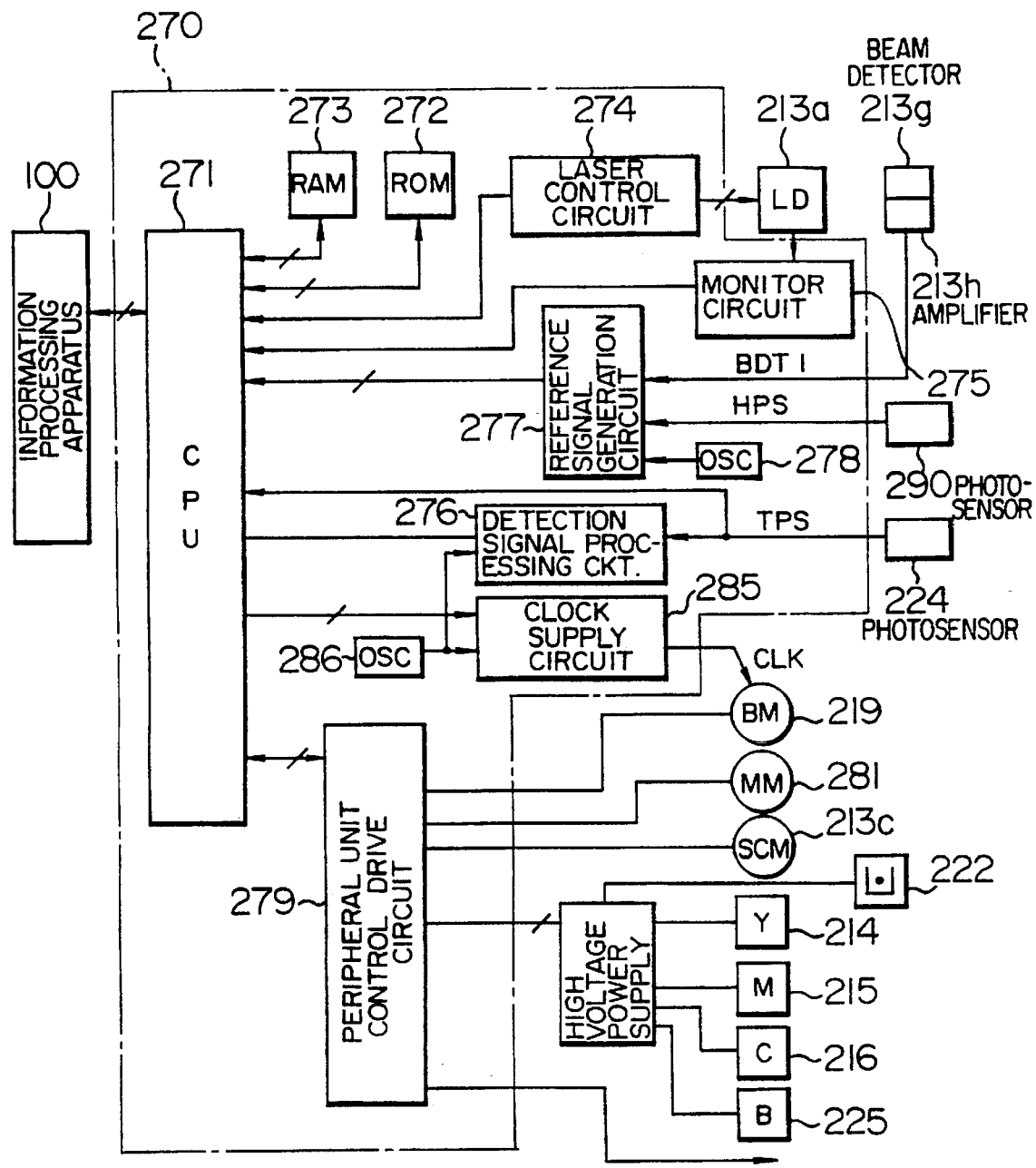
FIG. 4 is a block diagram showing details of the internal construction of a controller according to the present invention.

FIG. 4 is a block diagram showing details of the internal construction of the controller 270. The controller 270 has a CPU 271 as a main component and includes a ROM 272 for storing a program, a RAM 273 for storing error information and maintenance information, a laser control circuit 274 for controlling flicker of the semiconductor laser beam source 213a, a laser power monitor circuit 275 for detecting the intensity of a laser beam, a scanning synchronization reference signal generation circuit 277 for generating a scanning synchronization reference signal on the basis of a deflection scanning start reference detecting signal BDT1 detected by the beam detector 213a and amplified by the amplifier 213h and a reference position signal HPS of the auxiliary scanning direction delivered out of the photosensor 290 to detect the reference position mark formed on the photosensitive belt, an oscillator 278, a detection signal processing circuit 276 for receiving an intermediate transfer drum reference position signal TPS to detect a rotation speed of the intermediate transfer drum 221, a clock supply circuit 285 standing for photosensitive belt drive means rotation speed adjusting means and controlled by the CPU 271 to supply a reference clock to which the rotation speed of the photosensitive belt drive means (motor) is referenced and adjust the rotation speed of the photosensitive belt drive means (motor), an oscillator 286, and a peripheral unit control drive circuit 279 for controlling internal constituent means of the laser printer.

In the present embodiment, the internal constituent means of the printer includes the mirror drive motor 213c for driving the polygon mirror 213d, a main motor 281 for driving the paper sheet convey system, the belt drive motor 219 for driving the photosensitive belt 211, the developing units 214, 215, 216 and 225, and a high voltage power supply 283 for energizing the transferrer 222 and the like.

A printing control processing executed by the CPU 271 will now be described with reference to FIGS. 5 to 7. A control program is prepared on the premise that the information processing apparatus 100 and the laser printer 200 form toner images in order of yellow color, magenta color, cyan color and black color.

When the information processing apparatus 100 generates a printing request signal, the CPU 271 in the controller 270 of the laser printer 200 responds to the printing request signal to start the printing control processing in accordance with the control program stored in the ROM 272.

Figure 5:
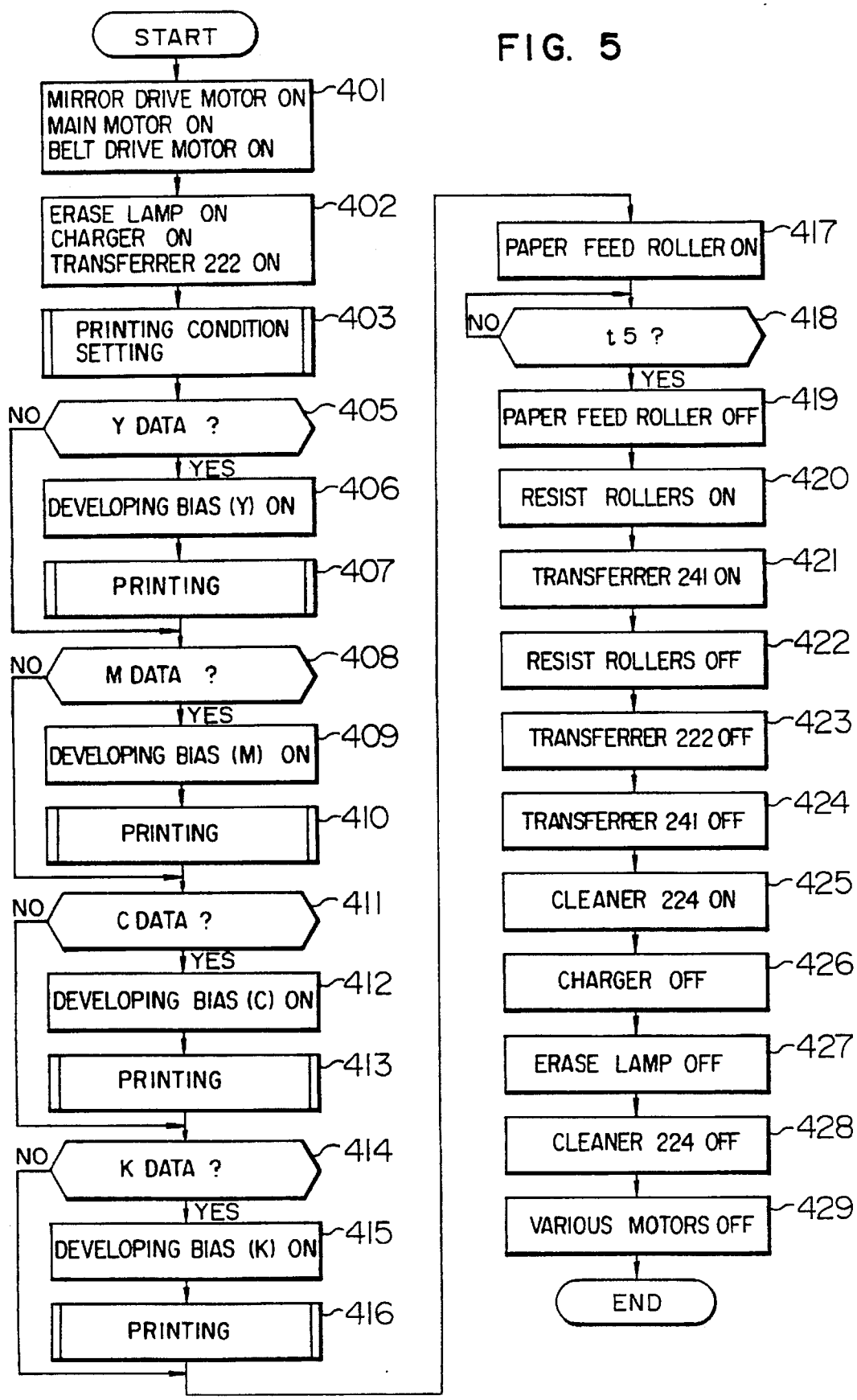
FIG. 5 is a flow chart of a printing control processing executed by a CPU of the controller according to the present invention.

In step 401 shown in FIG. 5, the mirror drive motor 213c, main motor 281 and belt drive motor 219 are first rotated, the peripheral unit control drive circuit 279 is controlled in step 402 to make the erase lamp 218, charger 212 and transferrer 222 ready for operation, and the program proceeds to printing condition setting step 403.

Figure 6:
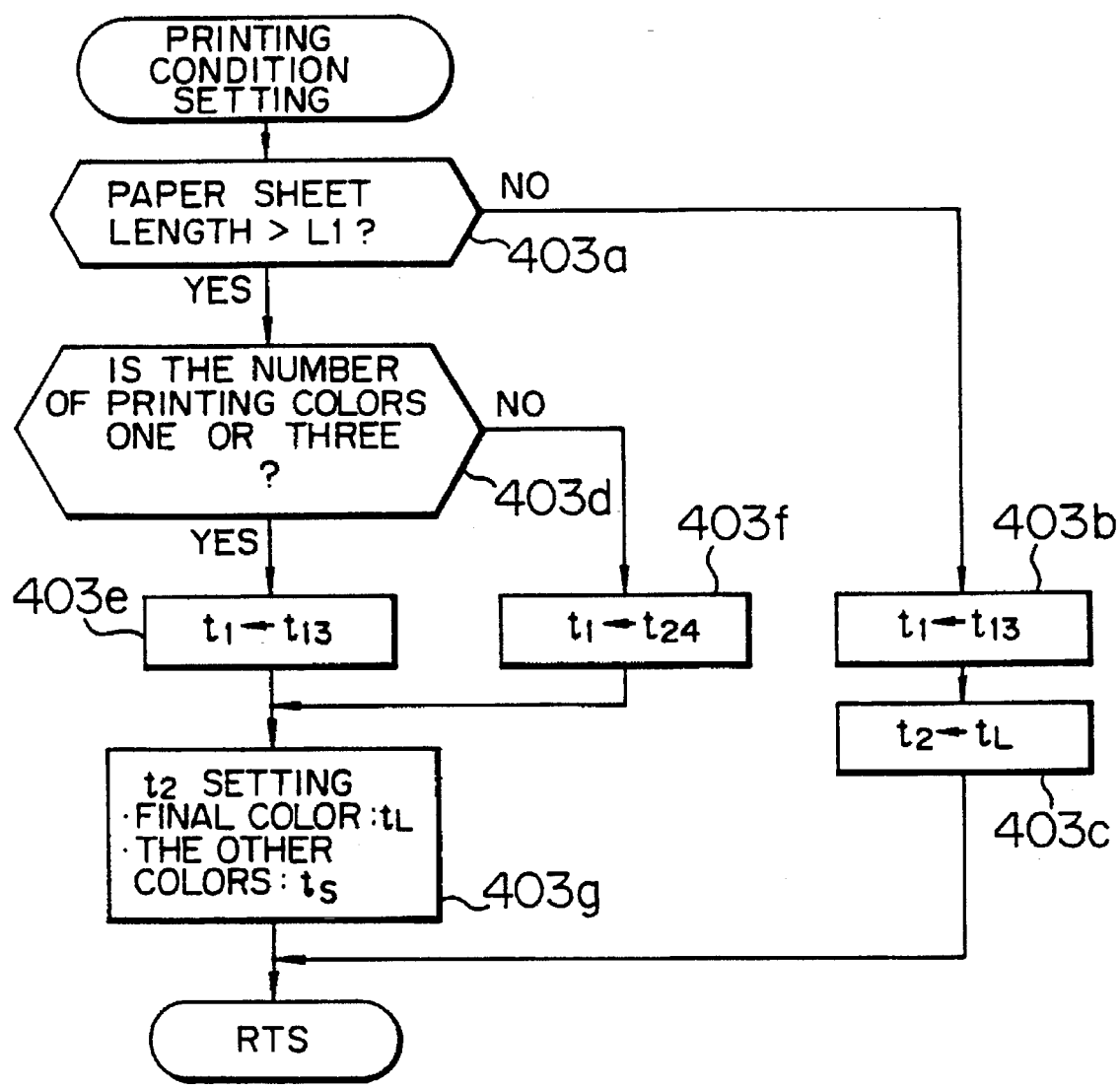
FIG. 6 is a flow chart showing details of a printing condition setting processing.

As shown in FIG. 6, in the printing condition setting step 403, it is checked whether a length of printing paper sheet designated by the information processing apparatus 100 in step 403a is larger than a printing area length L1 determined by the outer peripheral length of the intermediate transfer drum. If the length of printing paper sheet designated by the information processing apparatus 100 is smaller than L1, management time t1 managed in step 407b to be described later and beginning with the generation of an auxiliary scanning direction reference position signal HPS and ending with the generation of a permission signal Vsync for printing in the auxiliary scanning direction is set, in step 403b, with an initial value, that is, time (t13) for causing the formation of a latent image to start at a position immediately after the seam position of the photosensitive belt (a position which is set, in consideration of irregularity in mechanical factors such as the peripheral length of the photosensitive belt and irregularity in control, such that the electrostatic latent image does not overlap the belt seam). Further, in step 403c, generation periods t2(Y), t2(M), t2(C) and t2(B) of auxiliary scanning direction printing permission signals Vsync for respective toner colors, to be managed in step 407g to be described later, are all set to time (tL) corresponding to time necessary to convey a paper sheet 232 by its length in the convey direction, and then the step 403 ends.

When the printing paper length designated by the information processing apparatus 100 is larger than the L1, the number of printing colors designated by the information processing apparatus 100 is checked in step 403d. If the designated number of printing colors is one or three, the program proceeds to step 403e in which the management time t1 beginning with the generation of an auxiliary scanning direction reference position signal HPS and ending with the generation of an auxiliary scanning direction printing permission signal Vsync is set with the initial value (t13) as in the case of the step 403b. If the designated number of printing colors is two or four, the program proceeds to step 403f in which the management time t1 is set with t13+t0 (t0: time necessary for the intermediate transfer drum 221 to rotate by one round), that is, time (t24) for causing the formation of a latent image to start at a position which is the sum of the position immediately after the seam position of the photosensitive belt and a position corresponding to one round of the intermediate transfer drum 221. Further, in step 403g, the generation periods t2(Y), t2(M), t2(C) and t2(B) of auxiliary scanning direction printing permission signals Vsync, managed for respective printing processings of respective toner colors, are set. As a management value for the final color, the time (L1) corresponding to the time necessary to convey a paper sheet 232 by its length in the convey direction is set and as a management value for the other colors, time (ts) corresponding to a maximum printing area length L1 determined by the outer peripheral length of the intermediate transfer drum is set, thus ending the step 403. In step 405, it is checked whether a video signal applied from the information processing apparatus 100 corresponds to a toner image of yellow color. If the video signal corresponds to the yellow toner image, the program proceeds to step 406 in which the peripheral unit control drive circuit 279 is controlled such that a developing bias voltage for validating the developing function of the developing unit 214 is generated, and the program proceeds to printing step 407.

Figure 7:
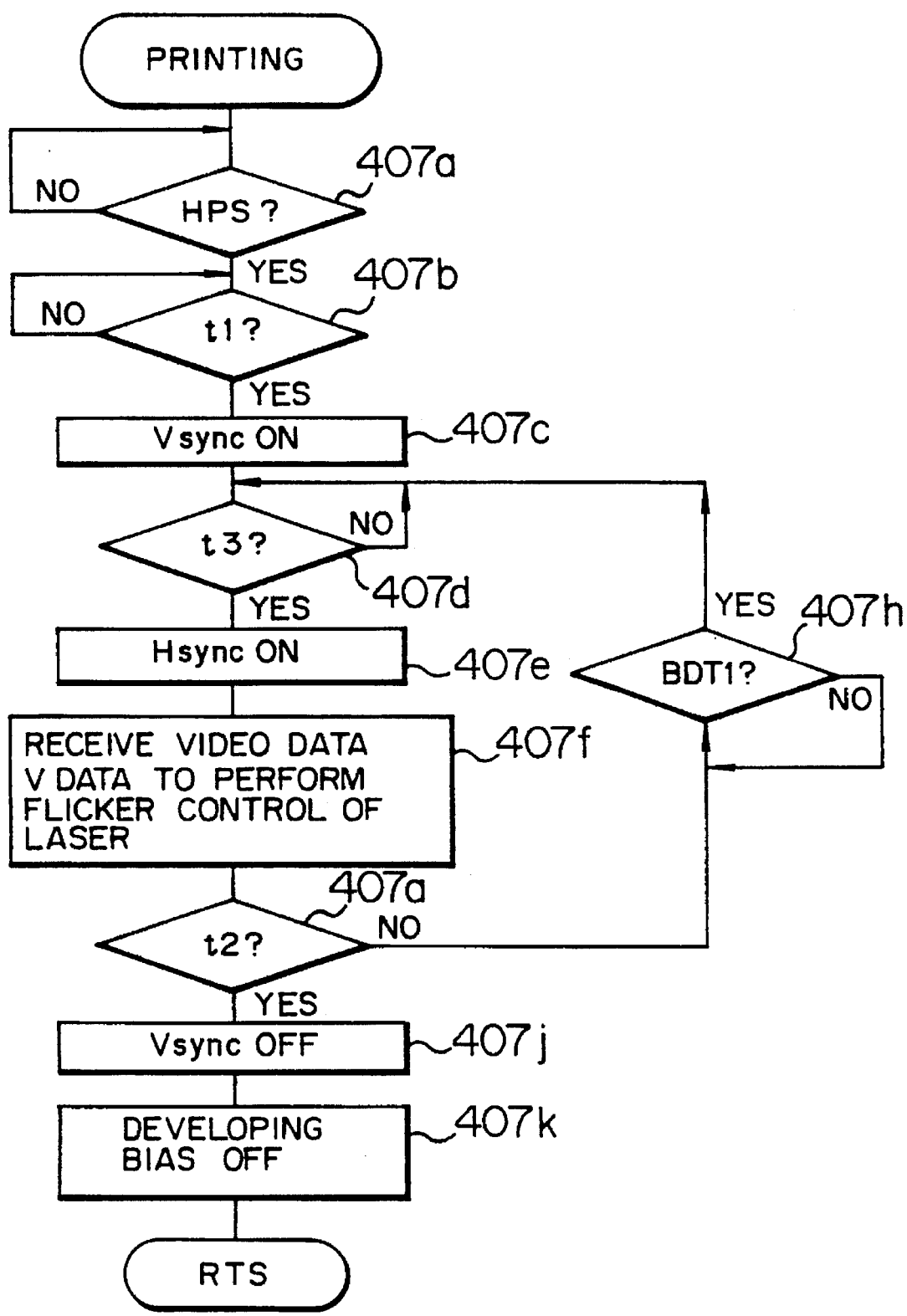
FIG. 7 is a flow chart showing details of printing control.

In the printing step 407, as shown in FIG. 7, the reception of an auxiliary scanning direction reference position signal HPS is monitored and when the photosensitive belt 211 advances and it is confirmed that the photosensor 209 generates the auxiliary scanning direction reference signal HPS at a write reference position, the program proceeds to step 407b.

In the step 407b, the time management is carried out in such a manner that the auxiliary scanning direction printing permission signal Vsync is generated after time t1 set in any one of the steps 403b, 403e and 403f has elapsed following the generation of the auxiliary scanning direction reference position signal HPS, and after the time t1 has elapsed, the program proceeds to step 407c in which the auxiliary scanning direction printing permission signal Vsync is generated (a signal line for transmission of the auxiliary scanning direction permission signal Vsync to the information processing apparatus is rendered to be low level). This time management is carried out by counting the main scanning synchronization reference signal BDT1.

Within the generation period of the auxiliary scanning direction printing permission signal Vsync, the time management is carried out in step 407d in such a manner that a main scanning direction printing permission signal Hsync is generated t3 time after the timing for generation of the main scanning synchronization reference signal BDT1, and after the time t3 has elapsed, the program proceeds to step 407e in which the main scanning direction printing permission signal Hsync is generated (a signal line for transmission of the main scanning direction printing permission signal Hsync to the information processing apparatus 100 is rendered to be low level). The main scanning direction printing permission signal Hsync is generated during a period t4 which corresponds to the time taken for scanning of a dimensional area in the width direction of a paper sheet 232 to be completed.

Thereafter, the program proceeds to step 407f in which a video signal Vdata transmitted from the information processing apparatus 100 is received in synchronism with the main scanning direction printing permission signal Hsync and transmitted to the laser control circuit 274 to flicker control the semiconductor laser 213a. Through flicker control of the semiconductor laser, an electrostatic latent image for one scanning line is formed on the surface of the photosensitive belt 211.

When the reception of video signal Vdata and flicker control of semiconductor laser are completed for one scanning line, the program proceeds to the step 407g in which it is checked whether the time is within the generation period t2 of the auxiliary scanning direction printing permission signal Vsync and if the generation period t2 of the auxiliary scanning direction printing permission signal Vsync prevails, the program proceeds to step 407h in which the generation of the next main scanning synchronization reference signal BDT1 is monitored. With the next main scanning synchronization reference signal BDT1 generated, the program returns to step 407d. When the generation period t2 of the auxiliary scanning direction printing permission signal Vsync ends, the program proceeds to step 407j in which the auxiliary scanning direction printing permission signal Vsync is returned to high level to end exposure of the yellow toner image. Subsequently, the program proceeds to step 407k in which an electrostatic latent image formed by the exposure is developed and thereafter the developing bias voltage is controlled so as to invalidate the developing function of the developing unit 214.

When the thus formed yellow toner image contacts the intermediate transfer drum 221, it is transferred to the surface of the intermediate transfer drum 221 and held on the surface.

Next, in step 408, it is checked whether the next video signal supplied from the information processing apparatus 100 corresponds to a toner image of magenta color. If the video signal corresponds to the magenta toner image, the program proceeds to step 409 in which the peripheral unit control drive circuit 279 is controlled such that a developing bias voltage for validating the developing function of the developing unit 215 is generated, and the program proceeds to printing step 410. In the printing step 410 for the second color, instead of the processing of waiting for the reception of the reference position signal HPS in the step 407a and the processing in the step 407b of managing the management time t1 beginning with the generation of the reference position signal HPS and ending with the generation of the auxiliary scanning direction printing permission signal Vsync during the previously-described printing step 407, time tr taken for the intermediate transfer drum 221 to complete the remainder of one revolution round (given that the time taken for the intermediate transfer drum 221 to make one evolution round is t0, tr=t0−t2) is managed and thereafter, through steps similar to the step 407c and ensuing steps, the magenta toner image is transferred to the surface of the intermediate transfer drum 221 and held thereon while being superposed on the yellow toner image.

Similarly, in step 411, it is checked whether a video signal supplied from the information processing apparatus 100 corresponds to a toner image of cyan color. If the video signal corresponds to the cyan toner image, the program proceeds to step 412 in which the peripheral unit control drive circuit 279 is controlled such that a developing bias voltage for validating the developing function of the developing unit 216 is generated, and the program proceeds to printing step 413. The printing step 413 is also carried out similarly to the printing step 410, so that the cyan toner image is also transferred onto the surface of the intermediate transfer drum 221 and held thereon while being superposed on the yellow toner image and magenta toner image.

Similarly, it is checked in step 414 whether a video signal supplied from the information processing apparatus 100 corresponds to a toner image of black color. If the video signal corresponds to the black toner image, the program proceeds to step 415 in which the peripheral unit control drive circuit 279 is controlled such that a developing bias voltage for validating the developing function of the developing unit 225 is generated, and the program proceeds to printing step 416. The printing step 416 is also carried out similarly to the printing step 410, so that the black toner image is also transferred to the surface of the intermediate transfer drum 221 and held thereon while being superposed on the yellow toner image, magenta toner image and cyan toner image.

In step 417, in order to transfer the toner images formed on the surface of the transfer drum 221 to a paper sheet 232, the paper sheet 232 is extracted by rotating the paper feed roller 233, the rotation is continued for t5 time to supply the paper sheet 232 to the resist rollers 234 in step 418, and the rotation of the paper feed roller 233 is stopped in step 419. Subsequently, in step 420, the resist rollers 234 are started to rotate by controlling the paper supply timing such that the paper sheet 232 contacts the transfer drum 221 while being brought into register with the toner images.

In step 421, at the timing for the fore end of the paper sheet 232 conveyed by the rotation of the resist rollers 234 to contact the transfer drum 221, the transferrer 241 is energized to electrostatically transfer the toner images on the surface of the intermediated transfer drum 221 to the paper sheet 232.

In this manner, the color toner images are transferred to the paper sheet 232 and fixed thereto while the paper sheet 232 with the transferred toner images being passed through the fixing unit 251 and the paper sheet 232 is discharged to the outside of the apparatus by means of the paper pay-out rollers 261.

The rotation of the resist rollers 234 which have completed the paper sheet conveyance is stopped in step 422, the supply of power to the transferrer 222 adapted to perform the transfer to the transfer drum from the photosensitive belt which has completed the transfer is stopped in step 423, the supply of power to transferrer 241 adapted to perform the transfer to the paper sheet from the transfer drum which has completed the transfer is stopped in step 424, the cleaner 223 is energized to in step 425 to start removal of toner remaining on the surface of the intermediate transfer drum 221 which has completed the transfer, the supply of power to the charger 212 which has completed charging is stopped in step 426, the erase lamp 218 which has completed the erase of residual electric charge is turned off in step 427, the cleaner 223 which has completed the removal of residual toner is deenergized in step 428, and stopping of various motors is executed in step 429.

FIGS. 8A, 8B and 9A, 9B show formation positions of toner of respective colors on the photosensitive belt in the aforementioned printing control when the paper sheet length is longer than the intermediate transfer drum outer peripheral length. Shown at (a) in FIG. 8A is the case of single color printing, in which the formation of a toner image is started at a position which is t13 distant from the detection of the belt seam position through the use of the reference position mark. Shown at (b) in FIG. 8B is the state of formation of toner image of three colors, in which printing of the first color is started at a position which is t13 time distant from the detection of the reference position mark as in the case of the single color and a toner image of the first color is formed within time t0 taken for the intermediate transfer drum to make one revolution round. In the Figure, the time for formation of a toner image is set to ts. Further, by recording the second color for equal time ts to that for the first color within time t0, a toner image can be formed which does not get entangled with the seam. A toner image of the third color has a length which is longer than the outer peripheral length of the transfer drum and is formed for time tL conforming to the length of the paper sheet. By forming the toner images on the photosensitive belt in this manner, the toner image of the final color conforming to the paper sheet length can be formed without being affected by the seam position.

FIGS. 9A and 9B show formation positions of toner images on the photosensitive belt in the case of two-color printing and four-color printing. By starting the formation of a toner image of the first color t24 or t24=t13+t0 after the detection of the reference position mark, a toner image of the final color having a length longer than the outer peripheral length of the intermediate transfer drum can be formed without overlapping the seam of the photosensitive belt.

Figure 10:
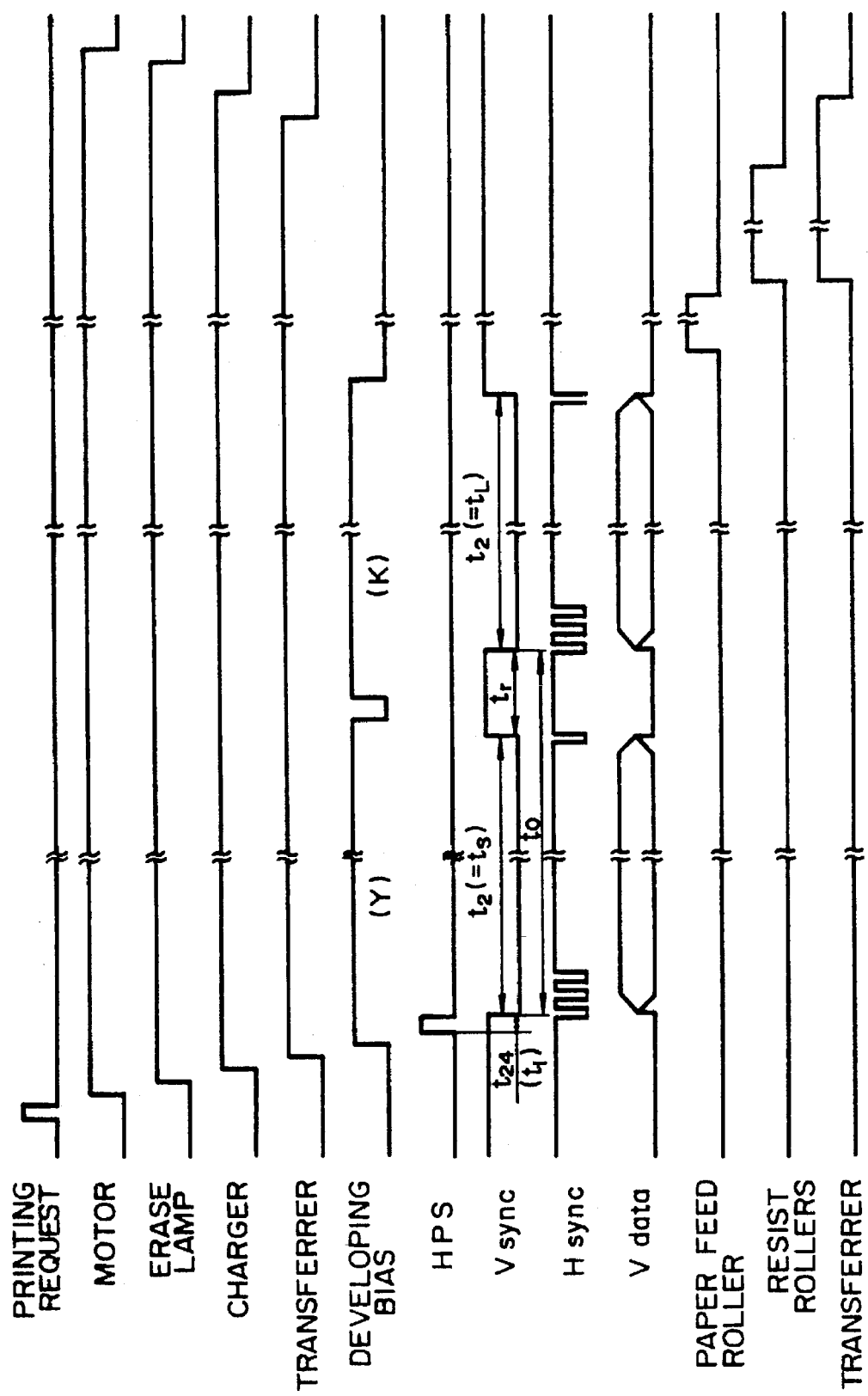
FIG. 10 is a timing chart of printing control by the controller of the present invention.

FIG. 10 is a timing chart of two-color printing (yellow and black) in the above-described printing control processing. When a printing request signal is inputted from the information processing apparatus, various motors are started to be driven in accordance with the flow chart shown in FIG. 5 and then the erase lamp, charger and transferrers are turned on. Subsequently, in accordance with the preset printing condition of two colors, the developing bias is turned on in the step 406. When the reference position signal HPS is detected in the step 407, printing is started at the expiration of time t24 to print yellow color for time ts. Thereafter, as a result of decision in the step 408, the program jumps to the step 411 and as a result of decision in the step 411, the program jumps to the step 414. Then, the program proceeds from the step 414 to the step 415 and black color is also printed for time tL after the expiration of time tr following the end of printing of yellow color. After this step ends, the paper feed roller and resist rollers are driven and then the transferrer 241 for the transfer from intermediate transfer drum to recording paper is driven.

As described above, according to the present invention, when toner images of two or more colors are superposed to print a color image, the printing area for the final color can be set up within a desired range in the direction of the paper sheet length regardless of the outer peripheral length of the intermediate transfer member and even with the photosensitive belt having the seam, an excellent color image can be obtained in which any image defects are not generated. Further, since the area for formation of an image of the final color can be allowed to amount up to the paper sheet length, the printing speed can be improved to advantage.

We claim:

1. A color printer comprising:

video signal generation means for generating image data;

light emission control means responsive to a video signal to control light emission of a laser beam source in accordance with a color of toner to be used;

exposure means including a rotary polygon mirror for scanning a laser beam from said laser beam source in the raster direction of a recording medium and a lens;

photodetection means for detecting that the scanned laser beam reaches a predetermined position and generating a printing synchronization signal;

a photosensitive member on which an electrostatic latent image is formed by said exposure means;

photosensitive member drive means for driving said photosensitive member;

developing means for developing the electrostatic latent image formed on said photosensitive member to form a toner image;

an intermediate transfer member which is partly in contact with said photosensitive member and to which toner images of different colors formed on said photosensitive member are transferred one by one to form color toner images; transfer means for collectively transferring the color toner images formed on said intermediate transfer member to a recording paper;

convey means for conveying said recording paper; and control means for controlling respective means to execute a printing processing, wherein said color printer comprises area setting means responsive to said video signal and a length of the recording paper in the convey direction to set areas at which electrostatic latent images are formed on said photosensitive member in respect of toner images of respective colors.

2. A color printer according to claim 1 wherein when the paper sheet length in the paper sheet convey direction is longer than the outer peripheral length of said intermediate transfer member, said area setting means sets, for the final color, the electrostatic latent image forming area in the paper sheet convey direction to an area which is longer than the outer peripheral length of said intermediate transfer member and sets, for the other colors, the electrostatic latent image forming areas to an area which is equal to or shorter than the outer peripheral length of said intermediate transfer member.

3. A color printer according to claim 1 wherein said photosensitive member has the form of a seamed belt and is provided with a reference position mark, a reference position detector for detecting said reference position mark and start position setting means responsive to an output of said reference position detector to set a position of starting formation of an electrostatic latent image in the rotation direction of said photosensitive member are provided, and said start position setting means sets, for the final color, a toner image formation start position immediately after a seam position of said belt.

* * * * *